United States Patent
Sorace et al.

[11] Patent Number: 6,036,917
[45] Date of Patent: Mar. 14, 2000

[54] CORROSION RESISTANT AUSTENITIC STAINLESS STEEL

[75] Inventors: Dominic A. Sorace, Server; John F. Grubb, Lower Burrell, both of Pa.

[73] Assignee: Allegheny Ludlum Corporation

[21] Appl. No.: 09/215,045

[22] Filed: Dec. 17, 1998

[51] Int. Cl.[7] .............................. C22C 38/34; C22C 38/42
[52] U.S. Cl. ................................................ 420/50; 420/49
[58] Field of Search ........................ 420/49, 50; 148/327

[56] References Cited

U.S. PATENT DOCUMENTS

| | | |
|---|---|---|
| 4,543,244 | 9/1985 | Jones et al. . |
| 5,028,396 | 7/1991 | Jones et al. . |
| 5,032,373 | 7/1991 | Jones et al. . |

FOREIGN PATENT DOCUMENTS 1534926  12/1978  United Kingdom .

OTHER PUBLICATIONS

Welding Handbook, Eighth Edition, vol. 4, "Materials and Applications Part 2", William R. Oates. Alexander M. Saitta, American Welding Society1998,, pp. 261–270.

*Primary Examiner*—Deborah Yee
*Attorney, Agent, or Firm*—Robert J. Pugh; Patrick J. Viccaro

[57] ABSTRACT

An alloy having a composition, by weight, of about 0.025% or less carbon, about 0.5 to about 4.1% manganese, about 5.5 to about 6.2% silicon, about 11 to about 15% chromium, about 9.0 to about 15.5% nickel, about 0.8 to about 1.2% molybdenum and about 0.8 to about 2% copper and the remainder being essentially iron with incidental impurities. This composition results in lean alloy content in a high silicon austenitic stainless steel for concentrated sulfuric acid service while maintaining a corrosion rate similar to and competitive with existing alloys for such service. Acceptable characteristics were found when hot working was carried out in the range of about 2100° F. to about 2200° F. Annealing in the range of about 1925° F. to about 2025° F. is preferred, as is rapid water quenching after annealing.

13 Claims, 3 Drawing Sheets

CORROSION RESISTANT AUSTENITIC STAINLESS STEEL

BACKGROUND OF THE INVENTION

1. Field of the Invention

The present invention relates generally to a corrosion resistant austenitic stainless steel. More particularly, the present invention relates to a stainless steel that is particularly well suited for use in an acidic environment. And still more particularly, the present invention relates to an austenitic stainless steel that is corrosion resistant in an environment of concentrated sulfuric acid.

2. Description of the Prior Art

It is known that stainless steels and alloys having high silicon content generally resist corrosion well in an environment of concentrated sulfuric acid, that is, concentrations of 90% or greater of sulfuric acid. As such, high silicon stainless steels and alloys are well suited for use as the materials of construction for equipment to manufacture concentrated sulfuric acid.

In applications such as sulfuric acid manufacturing facilities, corrosion resistance is not the only consideration that determines material selection. Cost considerations are always an important factor for material selection in any industry. Cost is particularly important in capital-intensive industries such as sulfuric acid manufacturing, due to the presence of low cost alternatives. One such alternative is brick-lined carbon steel. Brick-lined carbon steel is often selected over high silicon stainless steels and alloys because of its relatively low initial cost.

When silicon is added to an alloy, other alloying elements must be chosen so that the resulting alloy has acceptable corrosion resistance and other performance properties. For example, higher silicon austenitic alloys require additions of austenitizing elements, primarily nickel, for phase stability and ductility considerations. Higher alloy content translates to higher cost materials to the end user.

Based upon the above, the industry has commonly believed that in order to obtain superior corrosion resistance quantities in a concentrated sulfuric acid environment, an alloy must contain high amounts of silicon and/or other alloy elements. Conversely, alloys containing lesser amounts of alloying elements could be fabricated, but these alloys would not perform as well in corrosion resistance in certain concentrated sulfuric acid environments. Also, depending on the composition chosen, alloys with high amounts of alloying elements may be difficult to manufacture and fabricate. In discussing alloys herein, all compositions are provided by weight percentage.

The alloys that are commercially available and that are described in the patent literature demonstrate these common industry beliefs. For example, there have been commercial uses of high silicon alloys, such as 14.5% silicon cast iron having a designation of UNS F47003. However, these alloys are brittle and difficult to machine and weld, so that their manufacture is generally limited to castings. Thus, such material is not as versatile as wrought material in allowing a wide range of products.

A wrought alloy commonly used for its resistance to corrosion in a concentrated sulfuric acid environment is an alloy having the Unified Numbering System (UNS) designation of S30601. The UNS S30601 alloy has a composition of 0.015% max carbon, 17.0 to 18.0% chromium, 0.35% max copper, 1.0% max manganese, 0.05% max nitrogen, 17.0 to 18.0% nickel, 0.030% max phosphorous, 0.013% max sulfur, and 5.00 to 5.60% silicon. An alloy falling within the compositional ranges of UNS S30601 is disclosed in U.S. Pat. No. 4,543,244, U.S. Pat. No. 5,028,396 and U.S. Pat. No. 5,032,373, all to Jones et al.

Another alloy commonly used for applications demanding resistance to corrosion in a concentrated sulfuric acid environment is an alloy having the designation UNS S32615. The UNS S32615 alloy has a composition of 0.07% max carbon, 16.0 to 21.0% chromium, 1.5 to 2.5% copper, 2.0% max manganese, 0.3 to 1.5% molybdenum, 17.5 to 22.5% nickel, 0.045% max phosphorous, 0.030% max sulfur, and 4.8 to 6.0% silicon.

The UNS S30601 alloy has a relatively low alloy content but generally does not perform as well with respect to corrosion resistance as compared to other popular high silicon alloys, including the UNS S32615 alloy. Reportedly, the UNS S30601 alloy is not as resistant to process stream upsets (e.g., temperature or acid concentration excursions) as is that of the UNS S32615 alloy.

On the other hand, the UNS S32615 alloy performs relatively well in corrosion resistance. The higher nickel content of the UNS S32615 alloy coupled with copper and molybdenum aids the resistance to process upsets. However, this alloy has a relatively high alloy content. As a result, the UNS S32615 alloy would be relatively more costly to produce than the UNS S30601 alloy.

Other examples of high silicon alloys used for resistance to corrosion in a concentrated sulfuric acid environment include an alloy having a Werkstoff designation of 1.4390, which is marketed by VDM under the name 700Si Nicrofer® 2509Si7, as well as an alloy disclosed in Great Britain Patent No. 1,534,926. The Werkstoff 1.4390 alloy has a composition of 0.02% max carbon, 8.0 to 11.0% chromium, 2.0% max manganese, 0.50% max molybdenum, 22.0 to 25.0% nickel, and 6.5 to 8.0% silicon.

The Werkstoff No. 1.4390 alloy also performs relatively well with respect to corrosion resistance but it also has a relatively high alloy content. Furthermore, the high silicon content of the Werkstoff No. 1.4390 alloy also creates concerns for weld ductility, weld toughness and product toughness.

Finally, U.K. Patent No. 1,534,926 describes an alloy that exhibits good corrosion resistance in concentrated sulfuric acid environments. The U.K. Patent No. 1,534,926 describes at Table 3 several alloy composition variations of that invention, which alloy compositions are numbered 2 through 9. As can be seen in those described alloy compositions, either the amount of silicon is relatively high (i.e., above 6.5%) and/or the amounts of the other alloying elements are relatively high. For the alloy compositions having higher amounts of silicon, workability would suffer. And for those alloy compositions for which the sum of all alloying elements are higher, those alloys will be relatively costly to produce.

Therefore, there is a need in the stainless steel and alloy industry to create a material with a relatively low content of alloying elements, and thus being relatively inexpensive to produce while maintaining a relatively high level of corrosion resistance in a concentrated sulfuric acid environment. Accordingly, it is an object of the present invention to provide austenitic stainless steel that will be corrosion resistant in a concentrated sulfuric acid environment while optimizing the various alloying elements to provide products that can be efficiently wrought from a low cost combination of alloying elements.

SUMMARY OF THE INVENTION

The subject invention describes a new wrought austenitic stainless steel alloy for use in equipment to manufacture concentrated sulfuric acid. It is designed as a lower cost replacement and/or improved corrosion resistant alloy over existing austenitic stainless steels of nominally 4 to 7% silicon content.

The alloy of the present invention has a composition, by weight percent, of about 0.025% or less carbon, up to about 4.1% manganese, about 5.5 to about 6.2% silicon, about 11 to about 15% chromium, about 9.0 to about 15.5% nickel, about 0.8 to about 1.2% molybdenum and about 0.8 to about 1.2% copper, and the balance being iron as well as normal steelmaking residuals.

The subject invention creates the leanest possible alloy content in a high silicon austenitic stainless steel for concentrated sulfuric acid service while maintaining a corrosion rate similar to and competitive with existing alloys for such service, thereby creating a lower cost material to replace existing alloys. This was achieved through the use of a modified version of the Delong equation to further improve the accuracy of that equation. The modification centered around the silicon coefficient. The use of the modified Delong equation was instrumental in developing the alloy of the present invention with acceptable amounts of delta ferrite.

The alloy of the present invention had acceptable characteristics when processed as follows. Hot working was carried out in the range of about 2125° F. to about 2175° F. The preferred range of temperatures at which hot working should be carried out are from about 2100° F. to about 2200° F. Temperatures above about 2200° F. are not recommended due to insufficient hot strength, while at temperatures below 2100° F., it is expected that the material will not be able to be effectively worked. Within this range, lower hot work temperatures are preferred to minimize growth of delta ferrite and, thus, to produce better hot rolled surfaces and edge quality of coils, plates or other wrought products. Annealing in the range of about 1925° F. to about 2025° F. is preferred, however, the lower end of this range is particularly preferred as it allows solutioning of sigma phase and also minimizes formation of delta ferrite, which is beneficial to subsequent cold finishing. Rapid water quenching after annealing is preferred to suppress sigma formation during cooling.

Other objects and advantages of the invention will become apparent from a description of certain present preferred embodiments thereof shown in the drawings.

DETAILED DESCRIPTION OF THE PREFERRED EMBODIMENTS

Figure 1:
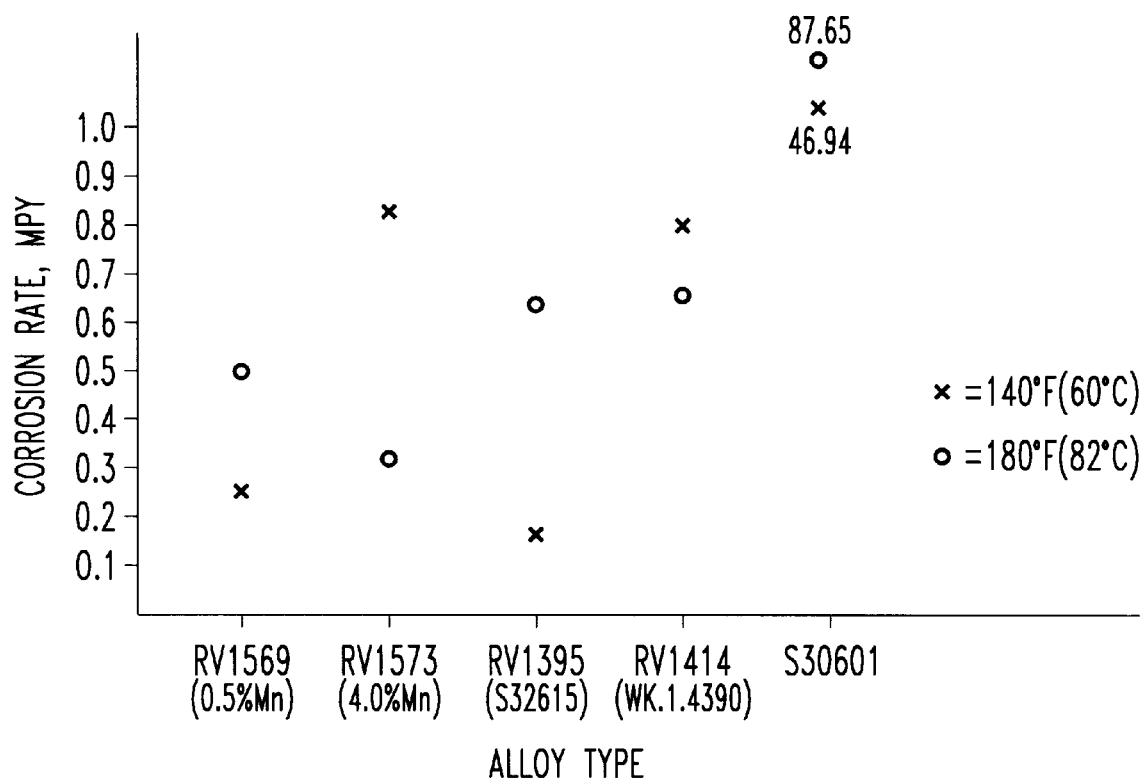
FIG. 1 is a graphical depiction of corrosion data of the alloy and a number of other alloys at 93% $H_2SO_4$ at 140° F. and 180° F.

The present invention provides an austenitic stainless steel that is corrosion resistant in a concentrated sulfuric acid environment while optimizing the various alloying elements to provide products that can be efficiently wrought from a low cost combination of alloying elements. A comparison of the alloying element composition between the iron-based alloy of the present invention and a number of other alloys herein discussed is as follows:

TABLE 1

|  | Werkstoff 1.4390 (Wt. %) | UNS S32615 (Wt. %) | UNS S30601 (Wt. %) | Present Alloy (Wt. %) |
| --- | --- | --- | --- | --- |
| C | 0.020 max | 0.07 max | 0.015 max | 0.025 max |
| Mn | 2.0 max | 2.0 max | 1.0 max | 0.5–4.1 |
| Si | 6.5–8.0 | 4.8–6.0 | 5.0–5.6 | 5.5–6.2 |
| Cr | 8.0–11.00 | 16.0–21.0 | 17–18 | 11–15 |
| Ni | 22.0–25.0 | 17.5–22.5 | 17–18 | 9.0–15.5 |
| Mo | 0.50 max | 0.3–1.5 | — | 0.8–1.2 |
| Cu | — | 1.5–2.5 | 0.35 max | 0.8–2.0 |
| Sum of nominal elemental values | 41.51 | 47.84 | 40.98 | 35.81 |

As can be seen from the above comparison, the sum of the nominal amounts of alloying elements of the alloy of the present invention is relatively low, being lower than that of the UNS S30601 alloy and the Werkstoff alloy and being markedly lower than the UNS S32615 alloy. The relatively low amount of allowing elements results in an alloy that is less expensive to produce. For example, the relatively high-cost element nickel is kept at or below 15.5%.

Corrosion testing of these alloys was conducted and the testing results are summarized below. Despite the relatively low quantities of alloying elements relative to the other above-referenced alloys for concentrated sulfuric acid service, the alloy of the present invention performed better in corrosion resistance testing than the UNS S30601 alloy and performed comparably in corrosion testing to these other alloys. In fact, for some of the testing conditions, the alloy of the present invention outperformed the Werkstoff alloy and the UNS S32615 alloy in the corrosion testing. The following corrosion data was derived by experiment, where alloys were produced according to the compositions above under similar processing and then tested. This data shows a comparison of the alloy of the present invention at nominal 0.50% manganese (Heat No. RV1569) and at nominal 4.0% manganese (Heat No. RV1573) versus a composition within the ranges of the UNS S32615 alloy (Heat No. RV1395), a composition within the ranges of the UNS S30601 alloy (Heat No. 055822) and a composition within the ranges of the Werkstoff 1.4390 alloy (Heat No. RV1418) in a matrix of concentrated sulfuric acid concentrations and temperatures. The data provided is subject to the precision of the underlying corrosion test, which is roughly plus or minus ten percent (10%). The following corrosion rate data is provided in units of MPY, which means milli-inches, or thousandths of an inch, per year.

TABLE 2

| Heat No. | Temp, ° F. (° C.) | $H_2SO_4$ Concentration | Corrosion Rate, MPY |
| --- | --- | --- | --- |
| RV1569 (0.5% Mn) | 140(60) | 93% | 0.25 |
| RV1573 (4.0% Mn) | 140(60) | 93% | 0.83 |
| RV1395 (S32615) | 140(60) | 93% | 0.16 |
| RV1418 (1.4390) | 140(66) | 93% | 0.81 |
| 055822 (S30601) | 140(60) | 93% | 46.94 |
| RV1569 | 140(60) | 96% | 0.06 |
| RV1573 | 140(60) | 96% | 0.06 |
| RV1395 | 140(60) | 96% | 0.00 |
| RV1418 | 140(60) | 96% | 0.16 |
| 055822 | 140(60) | 96% | 2.74 |

TABLE 2-continued

| Heat No. | Temp, °F. (°C.) | H₂SO₄ Concentration | Corrosion Rate, MPY |
|---|---|---|---|
| RV1569 | 180(82) | 93% | 0.50 |
| RV1573 | 180(82) | 93% | 0.32 |
| RV1395 | 180(82) | 93% | 0.64 |
| RV1418 | 180(82) | 93% | 0.66 |
| 055822 | 180(82) | 93% | 87.65 |
| RV1569 | 180(82) | 96% | 0.12 |
| RV1573 | 180(82) | 96% | 0.06 |
| RV1395 | 180(82) | 96% | 0.16 |
| RV1418 | 180(82) | 96% | 0.08 |
| 055822 | 180(82) | 96% | 2.79 |
| RV1569 | 180(82) | 98% | 0.06 |
| RV1573 | 180(82) | 98% | 0.00 |
| RV1395 | 180(82) | 98% | 0.08 |
| RV1418 | 180(82) | 98% | 0.16 |
| 055822 | 180(82) | 98% | 0.42 |
| RV1569 | 220(104.5) | 96% | 0.81 |
| RV1573 | 220(104.5) | 96% | 0.84 |
| RV1395 | 220(104.5) | 96% | 1.04 |
| RV1418 | 220(104.5) | 96% | 0.32 |
| 055822 | 220(104.5) | 96% | 10.77 |
| RV1569 | 220(104.5) | 98% | 0.19 |
| RV1573 | 220(104.5) | 98% | 0.32 |
| RV1395 | 220(104.5) | 98% | 0.24 |
| RV1418 | 220(104.5) | 98% | 0.24 |
| 055822 | 220(104.5) | 98% | 0.50 |

The composition of the RV 1569 heat of the alloy of the present invention, referenced above in weight percent, is 0.55% manganese, 0.027% phosphorous, 5.85% silicon, 14.04% chromium, 15.29% nickel, 0.97% molybdenum, 0.99% copper, 0.003% sulfur, 0.010% nitrogen and 0.016% carbon. The composition of the RV 1573 heat of the alloy of the present invention, referenced above in weight percent, is 4.01% manganese, 0.027% phosphorous, 6.00% silicon, 14.01% chromium, 13.46% nickel, 0.95% molybdenum, 0.98% copper, 0.0019% sulfur, 0.009% nitrogen and 0.020% carbon.

The composition of the RV 1395 heat (the UNS S32615 alloy), in weight percent, is 0.51% manganese, 0.024% phosphorous, 5.42% silicon, 17.27% chromium, 18.62% nickel, 1.04% molybdenum, 2.03% copper, 0.004% sulfur, 0.021% nitrogen and 0.010% carbon. The composition of the RV 1418 heat (the Werkstoff 1.4390 alloy), in weight percent, is 1.35% manganese, 0.019% phosphorous, 7.25% silicon, 8.98% chromium, 23.68% nickel, 0.24% molybdenum, 0.10% copper, 0.002% sulfur, 0.011% nitrogen and 0.012% carbon. The composition of the 055822 heat (the UNS S30601 alloy) is, in weight percent, 0.60% manganese, 0.008% phosphorous, 5.50% silicon, 17.49% chromium, 17.24% nickel, 0.03% molybdenum, 0.01% copper, 0.0032% sulfur, 0.0048% nitrogen and 0.008% carbon.

Figure 2:
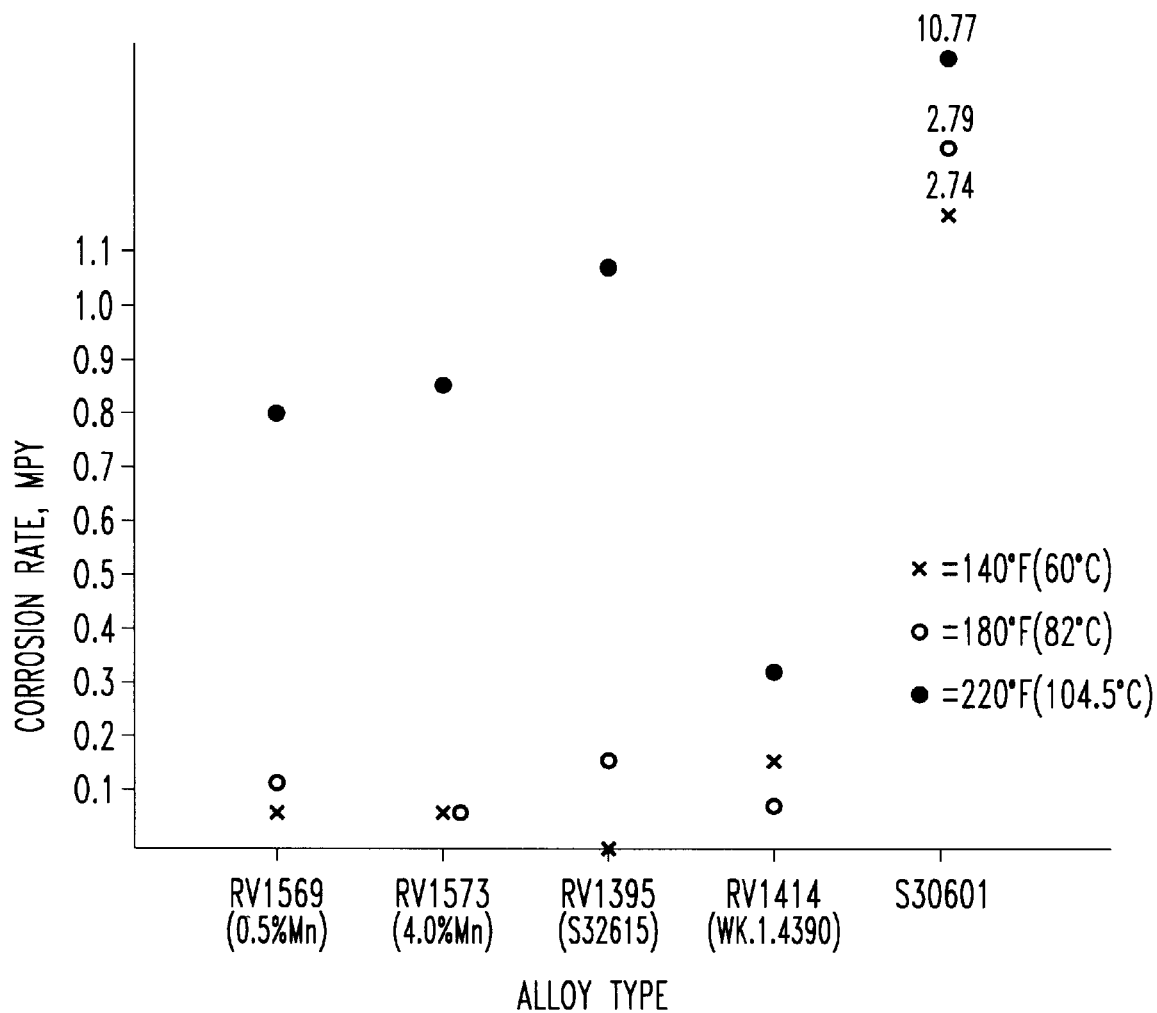
FIG. 2 is a graphical depiction of corrosion data of the alloy and a number of other alloys at 96% $H_2SO_4$ at 140° F., 180° F. and 220° F.
Figure 3:
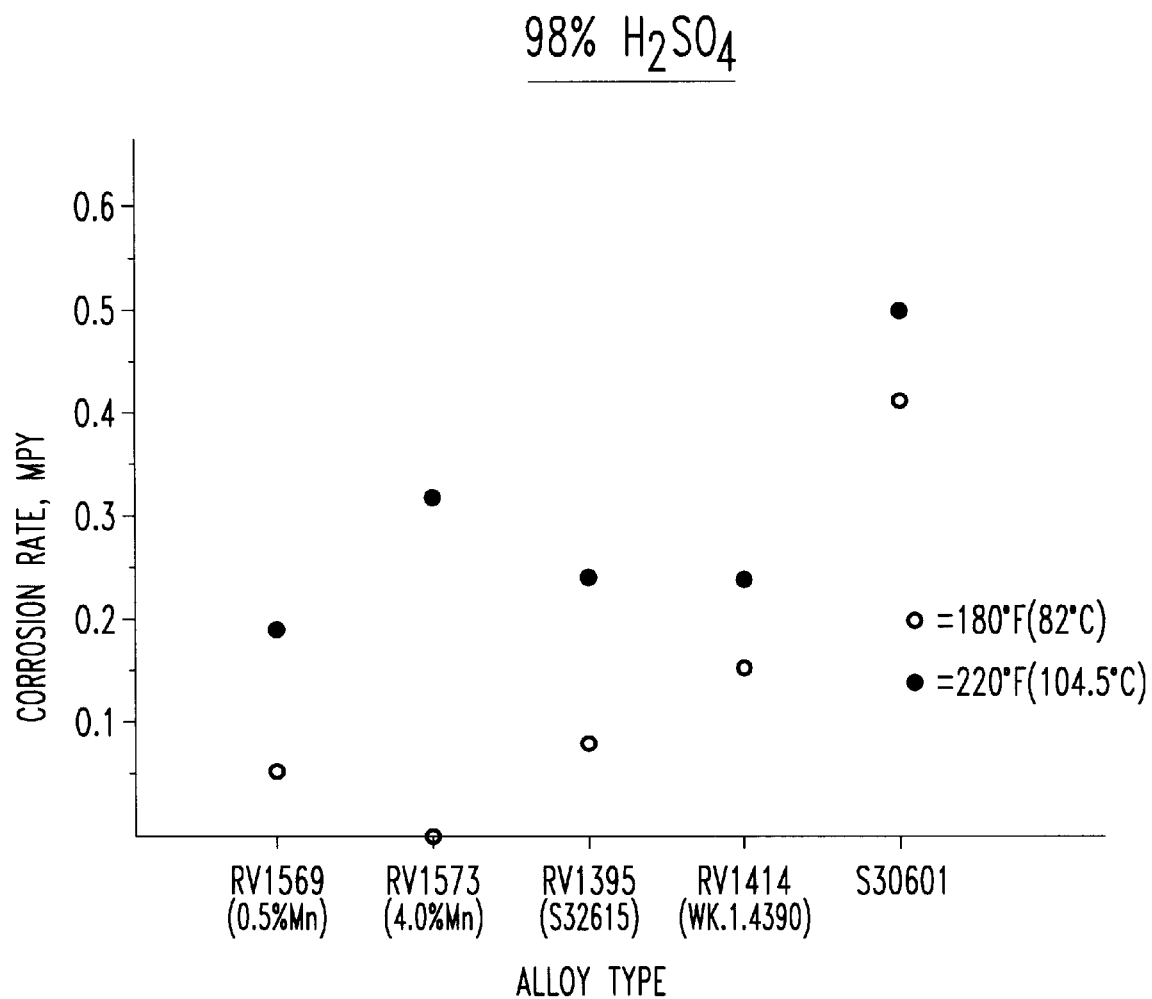
FIG. 3 is a graphical depiction of corrosion data of the alloy and a number of other alloys at 98% $H_2SO_4$ at 180° F. and 220° F.

In the concentrated sulfuric acid industry, a corrosion rate of 2 MPY or less is considered to be an acceptable design criterion for materials used in acid producing plants. Note that the alloy of the present invention at both nominal 0.5% and 4.0% manganese compositions have similar corrosion rates to the other alloys, particularly the UNS S32615 and the Werkstoff 1.4390 alloys, and in many cases, are better. The data also show a trend of better performance under certain of the test criteria at the higher manganese level in the alloy of the present invention. This data is graphically depicted in FIG. 1, FIG. 2 and FIG. 3.

Weld crack sensitivity testing was conducted on the UNS S32615 alloy using the Varestraint technique. The Varestraint technique was developed by Savage and Lundin and is well known in the stainless steel industry. The results of this testing suggests an increased propensity for cracking in both the fusion zone and heat affected zone versus that of the alloy of the present invention. This is thought to be due to the fully austenitic structure of the alloy and the primary austenite solidification mode of the weld, which is known for its propensity to hot cracking.

The alloy of the present invention is designed as a lower alloying element content alloy, and therefore a low cost alternative to the UNS S32615 alloy while maintaining or improving concentrated sulfuric acid corrosion resistance. Furthermore, the alloy of the present invention offers an improvement over the UNS 32615 alloy in the area of weld crack sensitivity by maintaining a chemistry balance that produces a small amount of delta ferrite in the weld that acts as a grain refiner. In addition, the delta ferrite also increases weld toughness. The beneficial effect of delta ferrite in welds is discussed in greater detail in the "Welding Handbook", $8^{th}$ Edition, Volume 4, Materials and Applications, Part 2, Chapter 5, pages 261–270.

The prediction (calculation) of delta ferrite was a challenge in developing the alloy of the present invention because use of the well-known Delong equation did not result in accurate data. The Delong equation has two parts—the chromium equivalent, which describes the applicable ferritizing elements, and the nickel equivalent, which describes the applicable austenitizing elements. The Delong equation provides that:

Chromium equivalent=chromium+molybdenum+1.5 silicon+0.5 niobium

Nickel equivalent=nickel+30 carbon+30 nitrogen+0.5 manganese

The coefficient of 1.5 for silicon in the chromium equivalent portion of the Delong equation predicted delta ferrite values that were not consistent with the actual measured amounts of delta ferrite. Through empirical testing, a coefficient of 1.2 for silicon was found to result in predictions that were more consistent with actual delta ferrite measurements.

The role of the various elements in the alloy of the present invention can be summarized as follows:

Carbon

Carbon is a residual element that is a very strong austenitizer but must be maintained at about 0.025% or less to avoid sensitization (chromium carbide precipitation) during welding and the attendant loss of corrosion performance. It is important to maintain carbon content as low as possible since the presence of silicon tends to reduce solid solution solubility of carbon.

Manganese

This is an alloying element that generally improves concentrated sulfuric acid corrosion resistance under certain test conditions up to a level of about 4 weight percent. In fact, acceptable material was produced having 4.1% manganese, as provided in the description of the test heats above. At levels of manganese higher than about 4.1%, problems with hot working, bend ductility and weldability deteriorate beyond an acceptable amount. This effect of higher manganese is a new discovery. While the higher manganese level is beneficial to certain corrosion conditions, hot workability and room temperature bend ductility may degredate somewhat at higher manganese levels. Manganese is used in the alloy of the present invention also as an austenitizing element to help reduce the more costly nickel content.

Phosphorus

This is a tramp element that should be maintained at low amounts, because at higher amounts the ductility and hot workability of the material will suffer. Preferably, the weight percent of phosphorus is kept at about 0.03% or lower.

Sulfur

This is a tramp element that has a very strong influence on hot workability. Preferably sulfur should be maintained at less than 0.004%.

Silicon

This is the key alloying element for concentrated sulfuric acid corrosion resistance. Generally, the higher the level of silicon the better the corrosion resistance of the material. However, as silicon content increases there is a degradation in tensile ductility and the ductility and toughness of weldments. As the level of silicon is increased, there is a need to balance the chemistry with austenitizers (usually nickel) to avoid excessive amounts of ferrite formation during hot working and welding. Thus higher silicon levels necessitate a careful rebalancing of austenitizing and ferritizing elements. Silicon content should certainly be held to less than 6.5%, and preferably, to 5.5 to 6.2%.

Chromium

As with silicon, this alloying element is a ferritizer and must be considered carefully to maintain proper alloy balance and lowest cost makeup of the base alloy. Chromium is needed to maintain passivity of the surface film, as in all stainless steels, but it is not as critical an element as silicon for corrosion resistance. Laboratory studies showed that 14% chromium compositions impart somewhat more corrosion resistance than 11% chromium compositions all other elements held constant, but even at 11% chromium, all corrosion rates were still less than 1 MPY. The weight percentage of chromium should therefore be held to a range of about 11% to 15%. For higher than 15% chromium, one or more austenitizers, for example nickel, should be added, or ferritizers, for example silicon or molybdenum, should be reduced to maintain the critical phase balance of the alloy of the present invention.

Nitrogen

This residual element is a strong austenitizer, as is carbon, but like carbon must also be held very low because of second phase considerations. Nitrogen can combine with silicon to form silicon nitride precipitates, a phase which removes silicon from solid solution, thereby lowering the effective amount of silicon for sulfuric acid corrosion resistance, and the nitride precipitates can also reduce tensile ductility and the ductility of weldments. Nitrogen should be held below 0.025%, and preferably below 0.015%.

Nickel

This element plays a pivotal role in alloy design and cost. Nickel is the major austenitizing element since carbon and nitrogen must be maintained as low as possible. Nickel, which is a relatively costly alloy, aids in improving ductility and toughness and contributes to sulfuric acid corrosion resistance. The nickel content is maintained to a maximum of about 15.5% and preferably as low as about 9.0%. Nickel is typically the last element to be adjusted to obtain a ferrite content of about 3–5% for weldability.

Copper

The amount of this element is preferably maintained at around 1% to provide additional corrosion resistance during excursions in process temperature or sulfuric acid concentration, and also during maintenance periods when the possibility of moisture pickup can make residual acid films more corrosive. The amount of copper should be kept to a maximum of around 2% because at higher amounts, hot ductility would suffer. Further, copper levels of 2.0% did not seem to improve corrosion resistance in the test matrix with acid concentrations of 93–98%.

Molybdenum

This alloying element is also maintained at around 1% to provide additional corrosion resistance during excursions in process temperature or sulfuric acid concentration, and also during maintenance periods when the possibility of moisture pickup can make residual acid films more corrosive. The amount of molybdenum should be minimized due to the relatively high cost of this alloying element. In addition, molybdenum levels of 2.0% did not seem to improve corrosion resistance in the test matrix with acid concentrations of 93–98%.

Stabilizing Elements

Small additions of Ti, Cb, Zr, Mg and other stabilizing elements could be added to tie up carbon and nitrogen.

The present invention incorporates two concepts that are contrary to what is well understood in the stainless steel and alloy industry to arrive at an alloy that performs well in sulfuric acid corrosion resistance but that has a relatively low content of alloying elements and is thus relatively inexpensive to produce.

The first concept is the modification to the Delong equation. It is known that chromium equivalents must be balanced against nickel equivalents in a ratio of 1.4 nickel equivalents to 1.0 chromium equivalents. And it is thought pursuant to the standard Delong equation that for every addition of 1% of silicon, an addition of 2.1% of a nickel equivalent must be made. The 2.1% nickel equivalent addition equals the 1.5 Delong chromium equivalent factor of silicon multiplied by the 1.4 balancing factor. However, as noted above, the Delong equation was found to be inaccurate with respect to empirical test results and the chromium equivalent factor for silicon was instead found to be 1.2. As a result, it was found that for every 1% of silicon that is added, only 1.68% of a nickel equivalent must be added. This 1.68% equals the newfound 1.2 Delong chromium equivalent factor multiplied by the 1.4 balancing factor. In high silicon alloys such as the alloy of the present invention, this discovery alone reduces the amount of alloying elements required.

The second concept is that more manganese may be used than previously thought practicable—up to around 4.1%. In high silicon alloys, nickel equivalent elements selected from carbon, nitrogen, copper, manganese and nickel must be added to balance the added silicon. As described above, nitrogen can combine with silicon to form silicon nitride precipitates, and carbon can allow chromium carbide precipitation during welding, reducing corrosion performance. Thus, nitrogen and carbon must be kept at low levels. Also, the amount of copper should be kept to a maximum of around 2% because at higher amounts, hot ductility would suffer. This leaves manganese and nickel as possible austenitizing elements to balance the ferritizing silicon addition. However, it was heretofore thought in the industry that sulfuric acid corrosion resistance decreases as manganese content increases. This is described at page 2, lines 110–117 of U.K. Patent No. 1,534,926. In fact, the alloys of the prior art previously discussed herein all recite manganese content of at most 2%. In contrast, it was found that the manganese could be increased to around 4% without adversely affecting sulfuric acid corrosion resistance. The ability to include more manganese allows for less nickel, which is quite costly, to be used.

The development of a modified Delong equation and use of that modified equation in optimizing the alloying elements of the alloy of the present invention, have resulted in an improved alloy. In particular, the alloy of the present invention performs better in corrosion testing than alloys of comparable alloying element content and performs as well in corrosion testing as alloys with a higher alloying element content.

While certain present preferred embodiments have been shown and described, it is distinctly understood that the invention is not limited thereto, but may be otherwise embodied within the scope of the following claims.

What is claimed is:

1. An austenitic stainless steel having favorable corrosion resistance in an environment of concentrated sulfuric acid, consisting essentially of, by weight, up to about 0.025% carbon, about 0.5 to about 4.1% manganese, about 5.5 to about 6.5% silicon, about 11 to about 15% chromium, about 9.0 to about 15.5% nickel, about 0.8 to about 1.2% molybdenum and about 0.8 to about 2% copper, the remainder being essentially all iron.

2. The austenitic stainless steel of claim 1, wherein the amount of silicon is from about 5.5 to about 6.2%.

3. The austenitic stainless steel of claim 1, wherein phosphorous is also present in an amount of up to about 0.03%.

4. The austenitic stainless steel of claim 1, wherein sulfur is also present in an amount of up to about 0.004%.

5. The austenitic stainless steel of claim 1, wherein nitrogen is also present in an amount of up to about 0.025%.

6. The austenitic stainless steel of claim 1, wherein nitrogen is also present in an amount of up to about 0.015%.

7. The austenitic stainless steel of claim 1, wherein the steel is subjected to hot working in the range of about 2100° F. to about 2200° F.

8. The austentitic stainless steel of claim 7, wherein the steel is further subjected to annealing in the range of about 1925° F. to about 2025° F. following hot working.

9. The austenitic stainless steel of claim 8, wherein the steel is further subjected to rapid water quenching following annealing.

10. The austenitic stainless steel of claim 1, wherein the amount of copper is from about 0.8 to about 1.2.

11. An austenitic stainless steel consisting essentially of, by weight, about 0.55% manganese, 0.027% phosphorous, 5.85% silicon, 14.04% chromium, 15.29% nickel, 0.97% molybdenum, 0.99% copper, 0.003% sulfur, 0.010% nitrogen and 0.016% carbon, and the remainder essentially all iron.

12. An austenitic stainless steel consisting essentially of, by weight, about 4.01% manganese, about 0.027% phosphorous, about 6.00% silicon, about 14.01% chromium, about 13.46% nickel, about 0.95% molybdenum, about 0.98% copper, about 0.0019% sulfur, about 0.009% nitrogen and about 0.020% carbon, and the remainder essentially all iron.

13. An austenitic stainless steel having favorable corrosion resistance in an environment of concentrated sulfuric acid at about 90% sulfuric acid or greater at temperatures of about 60° C. or greater, consisting essentially of, by weight, up to about 0.025% carbon, about 0.5 to about 4.1% manganese, about 5.5 to about 6.5% silicon, about 11 to about 15% chromium, about 9.0 to about 15.5% nickel, about 0.8 to about 1.2% molybdenum and about 0.8 to about 2% copper, the remainder being essentially all iron.

* * * * *